SAMUEL LEE.
Improvement in Culinary Vessels.

No. 118,462.

Patented Aug. 29, 1871.

2 Sheets--Sheet 1.

Witnesses,
N. W. Stearns
W. J. Cambridge

Inventor
Samuel Lee

SAMUEL LEE.
Improvement in Culinary Vessels.

No. 118,462.

Patented Aug. 29, 1871.

2 Sheets--Sheet 2.

Witnesses
N. W. Stearns
W. J. Cambridge

Inventor
Samuel Lee

*Reissued Oct. 31st 1871*

118,462

UNITED STATES PATENT OFFICE.

SAMUEL LEE, OF TAUNTON, MASSACHUSETTS.

IMPROVEMENT IN CULINARY VESSELS.

Specification forming part of Letters Patent No. 118,462, dated August 29, 1871.

*To all whom it may concern:*

Be it known that I, SAMUEL LEE, of Taunton, in the county of Bristol and State of Massachusetts, have invented certain Improvements in Culinary Utensils for use on Stoves, Ranges, &c.; and I hereby declare the following to be a full, clear, and exact description thereof, reference being had to the accompanying drawing making part of this specification, in which—

Figure 1:
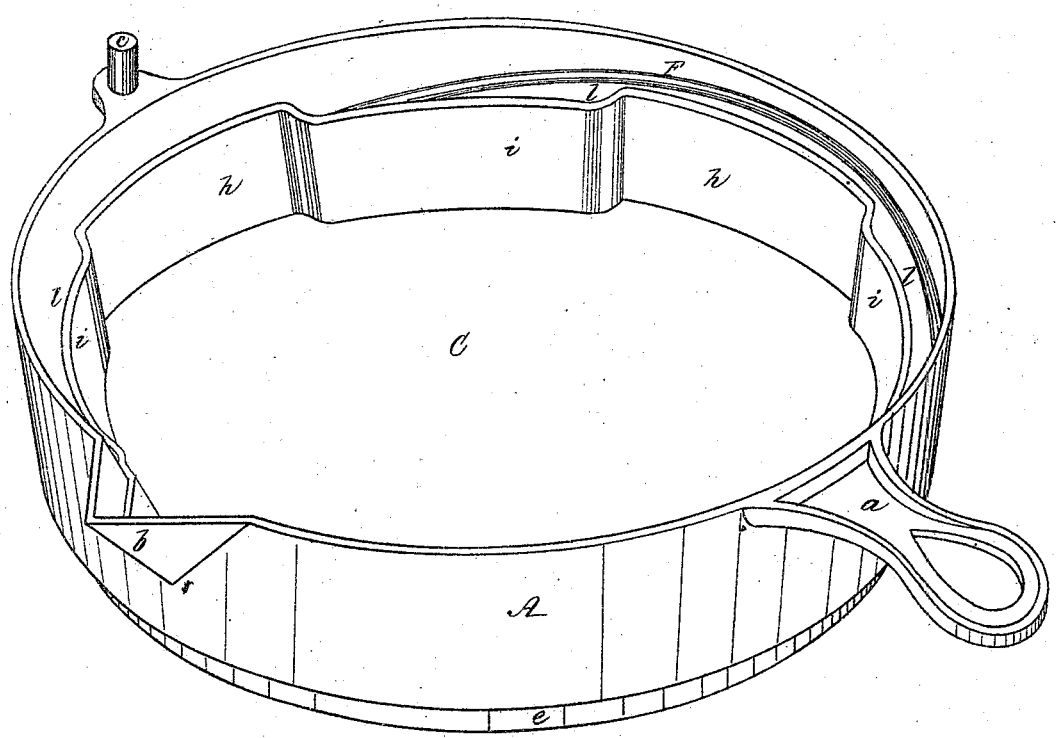
Figure 2:
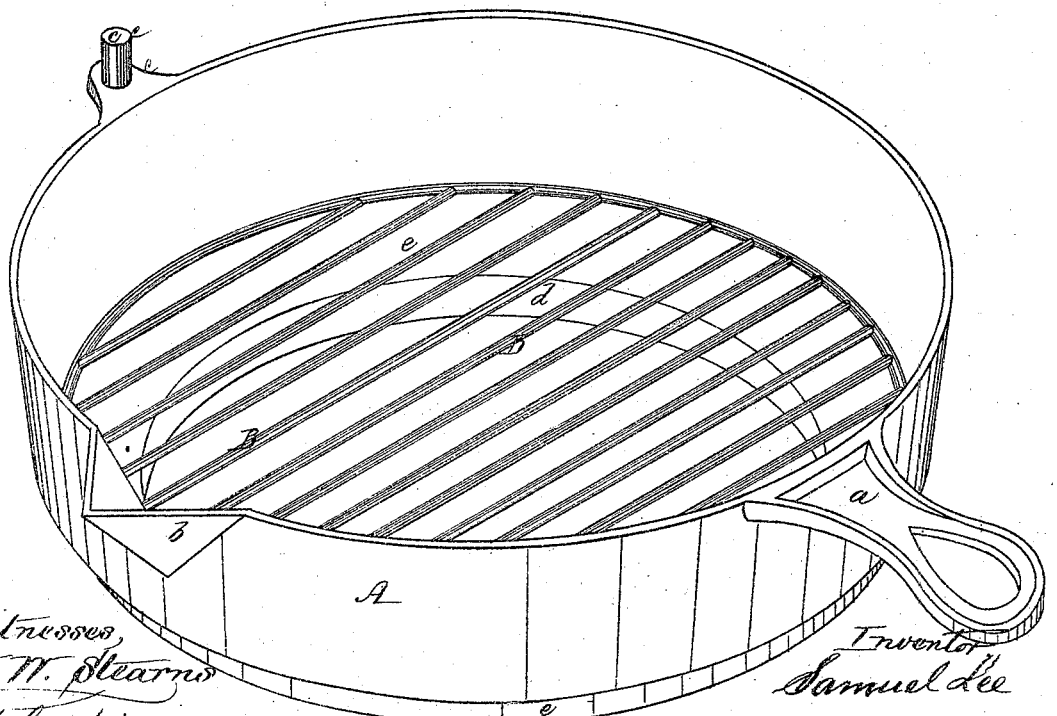
Figure 3:
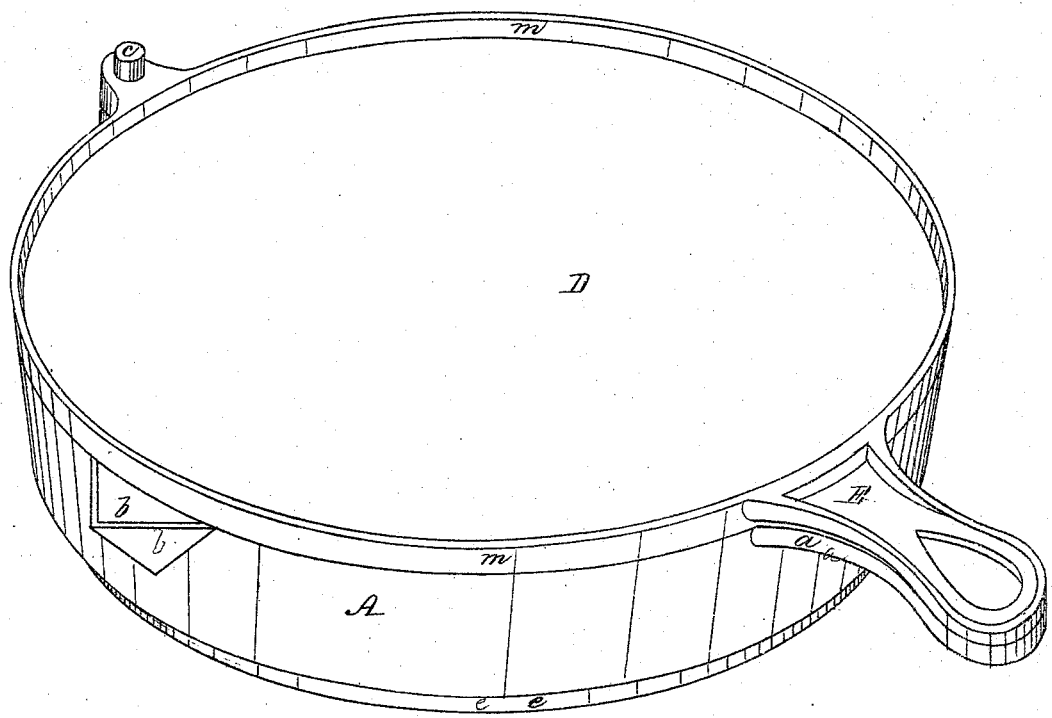
Figure 4:
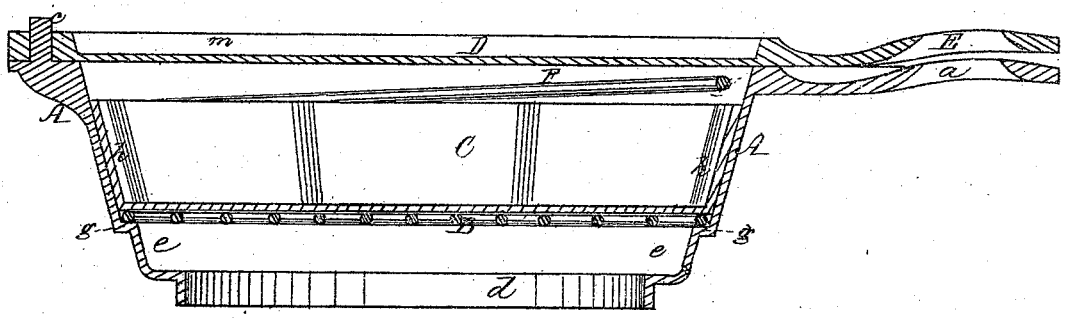

Figure 1 is a perspective view of a fry-pan applied to a frame. Fig. 2 is a perspective view of a broiler applied to a frame. Fig. 3 is a perspective view of a griddle applied thereto. Fig. 4 is a longitudinal vertical section through the center of the several utensils when in place.

My invention consists in a broiler or fry-pan, or both, placed within a frame provided with a griddle for its cover, whereby the several operations of broiling, frying, and baking may be performed in a convenient manner, and articles after being cooked in the pan or on the broiler may be kept hot upon the griddle until required for use, the fry-pan being so constructed that when it is placed within the frame one or more spaces are formed between them to allow the gases, smoke, and odor of the food being cooked to be carried through the stove or range up the flue instead of escaping into the kitchen and through the house, the several utensils when not required for use being compactly put together so that they will only occupy the space ordinarily occupied by each respective utensil.

To enable others skilled in the art to understand and use my invention, I will proceed to describe the manner in which I have carried it out.

In the said drawing, A is a cast-iron frame of nearly circular form, provided with a handle, $a$, spout $b$, and stud or projection $c$ cast in one and the same piece therewith. The outside of the frame is provided with an annular lip or rim, $d$, which fits into one of the ordinary circular pot-holes of the stove or range to keep it in place thereon. The diameter of the interior of the bottom of the frame is enlarged at $e$, in order that a greater area may be afforded for the reception of the article to be cooked, which, when required to be broiled, is placed on a grate, B, or series of bars, which is supported by its periphery resting on a circular rim or flange, $g$, formed within the interior of the frame, a short distance above the point $e$, where it is enlarged. A circular plate, D, with a handle, E, and a rim, $m$, on its upper side extending round its outer edge serving as a griddle, and also a cover, is now fitted over the stud or projection $c$, the whole of the top of the frame being covered except its spout $b$, in order that the fumes of the article being cooked may not escape into the room and through the house, the aperture formed by the open spout affording a passage for the air to draw down into the stove and carry the gases, smoke, and disagreeable odors up the flue of the chimney.

When the article of food is to be fried a fry-pan, C, is placed so that portions $h$ of its perimeter may rest either upon the rim or flange $g$, or upon the grate, if it be not removed, and the article is placed within the pan and the griddle swung into place, so as to cover the frame except its spout. This pan is so constructed that alternate portions $i$ of its side or rim are of less diameter than the portions $h$, forming a series of alternate spaces, $l$, between the interior of the frame A and the outside of the pan through which the fumes are carried into the stove and up the chimney, as before described.

When griddle, buckwheat, or other similar cakes are to be baked, the fry pan is removed and also the broiler, if desired, after which the griddle or plate D is swung over into place ready to receive the batter.

The griddle, besides being used as a cover and to bake cakes upon, may also be employed for receiving and keeping hot the food taken from the broiler and fry-pan, the rim $m$ preventing the escape of the juices, melted fat, &c.

F is the bail of the fry-pan, by which it may be transported to or from its place in the frame; but the fry-pan may be provided with a handle instead of a bail, and the permanent handles of both the fry-pan and griddle may be dispensed with, and they be removed from place to place by means of a lifter fitting into a socket formed thereon.

What I claim as my invention, and desire to secure by Letters Patent, is—

The culinary utensil, consisting of the frame A, broiler B, fry-pan C, and pivoted griddle D, constructed as herein shown and described.

Witness my hand this 26th day of July, 1871.

SAMUEL LEE.

Witnesses:
N. W. STEARNS,
W. J. CAMBRIDGE.